United States Patent

[11] 3,627,770

[72] Inventor George Levitt
 Wilmington, Del.
[21] Appl. No. 22,028
[22] Filed Mar. 23, 1970
[45] Patented Dec. 14, 1971
[73] Assignee E. I. du Pont de Nemours and Company
 Wilmington, Del.
 Original application June 12, 1967, Ser. No. 646,153, now Patent No. 3,511,851. Divided and this application Mar. 23, 1970, Ser. No. 22,028

[54] HETEROCYCLIC AMINO-OXAZOLINES
 2 Claims, No Drawings
[52] U.S. Cl. .................................... 260/288
[51] Int. Cl. .................................... C07d 35/10, C07d 33/10
[50] Field of Search .......................... 260/288

[56] References Cited
 UNITED STATES PATENTS
 3,509,170 4/1970 Levitt .................. 260/288 X Primary Examiner—Donald G. Daus
Attorney—Don M. Kerr ABSTRACT: Amino-oxazolines useful as central nervous system depressants having the formula

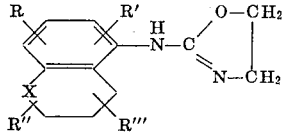

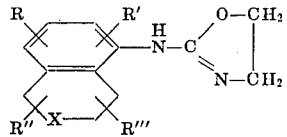

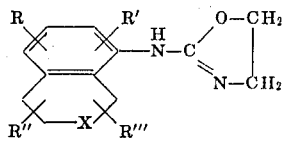

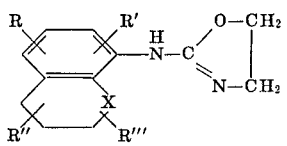

wherein X is oxygen, sulfur or methylamino;
R is hydrogen or alkyl;
R' is hydrogen, alkyl, alkoxy, alkylthio, dimethylamino, fluorine, chlorine or bromine;
R'' is hydrogen or alkyl;
R''' is hydrogen or alkyl.

Typical is 2-(8-thiochromanylamino)-2-oxazoline useful as a central nervous system depressant.

HETEROCYCLIC AMINO-OXAZOLINES

CROSS-REFERENCE TO RELATED APPLICATION

This application is a divisional of my application Ser. No. 646,153, filed June 12, 1967 now U.S. Pat. No. 3,511,851.

BACKGROUND OF THE INVENTION

The following applications relate to various classes of oxazolines generally useful as pharmaceuticals:
Harvey, Ser. No. 521,746, filed Jan. 19, 1966 now U.S. Pat. No. 3,453,284;
Levitt, Ser. No. 479,054, filed Aug. 10, 1965 now U.S. Pat. No. 3,499,083;
Levitt, Ser. No. 479,055, filed Aug. 10, 1965 now U.S. Pat. No. 3,499,084;
Harvey, Ser. No. 468,999, filed July 1, 1965;
Harvey Ser. No. 348,290, filed Feb. 28, 1964 now abandoned;
Harvey, Ser. No. 313,756, filed Sept. 30, 1963; granted as U.S. Pat. No. 3,432,600.

The present invention is directed to a new class of oxazolines having central nervous system depressant activity.

SUMMARY OF THE INVENTION

This invention relates to amino-oxazolines.
More specifically this invention refers to compounds of the formula:

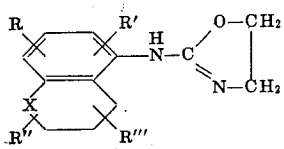

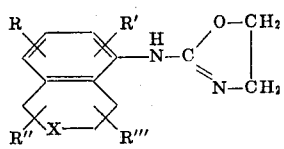

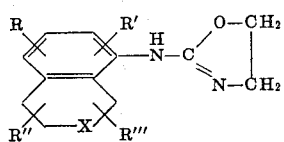

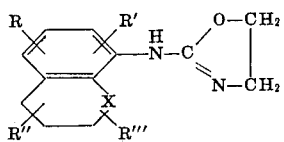

wherein
X is oxygen, sulfur or methylamino;
R is hydrogen or alkyl of one through four carbon atoms;
R' is hydrogen, alkyl of one through four carbon atoms, alkoxy of one through four carbon atoms, alkylthio of one through four carbon atoms, dimethylamino, fluorine, chlorine, or bromine;
R'' is hydrogen or alkyl of one through four carbon atoms;
R''' is hydrogen or alkyl of one through four carbon atoms.

Preferred because of outstanding central nervous system depressant activity are those compounds in formulas 1., 2., 3. and 4. in which X is oxygen or sulfur, R, R' and R''' are hydrogen and R' is alkyl, alkoxy or hydrogen.

The manner and process of making and using this invention is described in U.S. Pat. No. 3,511,851, U.S. Class No. 260, Subclass No. 307, issued May 12, 1970, the disclosure of which is herein incorporated by reference.

I claim:
1.

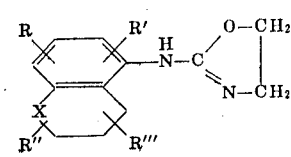

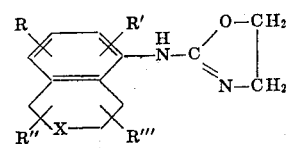

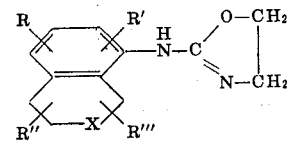

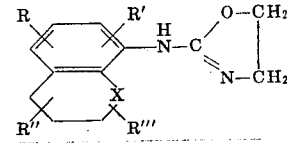

wherein
X is NCH$_3$;
R is selected from the group consisting of hydrogen and methyl;
R' is selected from the group consisting of hydrogen; alkyl of one through four carbon atoms, and alkoxy of one through four carbon atoms;
R'' is selected from the group consisting of hydrogen and methyl; and
R''' is selected from the group consisting of hydrogen and methyl.

2. A compound according to claim 1 which is 2-(1,2,3,4-tetrahydro-1-methyl-5-quinolinylamino)-2-oxazoline.

* * * * *